March 22, 1955   H. M. NICHOLSON   2,704,440
GAS TURBINE PLANT
Filed Dec. 29, 1952   3 Sheets-Sheet 1
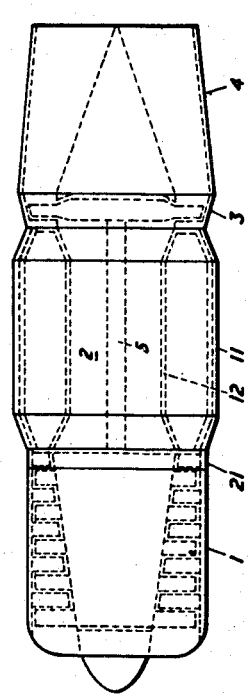
Inventor
Harold Metcalf Nicholson
By
Stevens, Davis, Miller + Mosher
his Attorneys March 22, 1955 H. M. NICHOLSON 2,704,440
GAS TURBINE PLANT Filed Dec. 29, 1952 3 Sheets-Sheet 2

Inventor
Harold Metcalf Nicholson
By
Stevens, Davis, Miller & Mosher
his Attorneys March 22, 1955  H. M. NICHOLSON  2,704,440
GAS TURBINE PLANT Filed Dec. 29, 1952  3 Sheets-Sheet 3

Inventor
Harold Metcalf Nicholson
By
Stevens, Davis, Miller & Mosher
His Attorneys

United States Patent Office 2,704,440
Patented Mar. 22, 1955

2,704,440

GAS TURBINE PLANT

Harold Metcalfe Nicholson, Silver Spring, Md., assignor to Power Jets (Research and Development) Limited, London, England, a British company Application December 29, 1952, Serial No. 328,489

Claims priority, application Great Britain January 17, 1952

7 Claims. (Cl. 60—39.65)

This invention relates to gas turbine power plant and is more particularly concerned with the construction of the combustion chamber and turbine nozzle ring.

In a gas turbine plant, the combustion chamber normally comprises an air casing enclosing one or more flame tubes. Only part of the air is led directly into the primary combustion zone of the flame tube, the remainder being led in further downstream to mix with and cool the hot combustion gases.

This system is normally quite satisfactory, but in high intensity combustion chambers wherein it is desired to keep the size to a minimum, it is found that excessive pressure losses occur in mixing the combustion gases and cooling air.

In one known arrangement for mixing the cooling air with the gases the downstream end of the flame tube is formed with longitudinally extending flutes or corrugations. These will produce alternate layers of cold air and hot combustion gases beyond the downstream end of the flame tube, and the layers will subsequently mix by diffusion. Such a system is shown in British patent specification No. 598,947. This again requires a fairly long mixing chamber if uniform temperature conditions are to be produced at the turbine inlet.

According to the present invention, there is provided a gas turbine plant comprising a combustion chamber made up of an annular air casing discharging into a turbine nozzle ring and an annular flame tube coaxially enclosed thereby, wherein at least one of the walls of the flame tube has its downstream end formed with longitudinally extending corrugations forming circumferentially alternating passages for streams of hot gases from the flame tube and cooling air from the space between the flame tube and the enclosing air casing, and the turbine nozzle vanes are equal in number to and each aligned with one of the streams of cooling air from the said passages.

The invention will now be particularly described with reference to the accompanying drawings of which:

Fig. 1 is an outside view of an aircraft gas turbine jet propulsion power plant.

Fig. 2 is a longitudinal section of the upper part of the combustion chamber and turbine of the power plant shown in Fig. 1.

Figure 3:
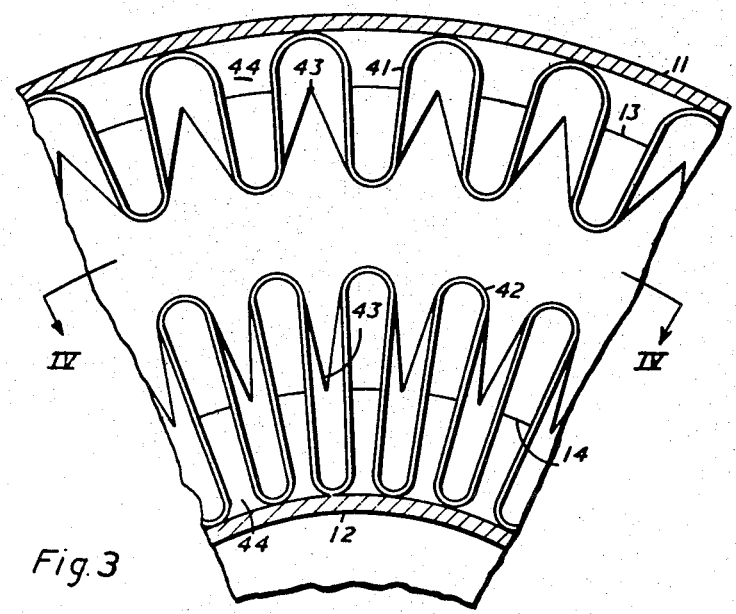
Fig. 3 is a fragmentary section taken on the line III—III in Fig. 2.

Referring to Fig. 1 a gas turbine jet propulsion power plant more particularly intended for use in a very high-speed aircraft comprises a multistage axial flow compressor 1, an annular combustion chamber 2, a turbine 3 and a jet pipe 4, the turbine and compressor rotors being mounted on a common driving shaft 5. The compressor 1 serves to deliver compressed air to the combustion chamber 2 to which fuel is supplied and the combustion gases are discharged from the combustion chamber to drive the turbine 3. The turbine drives the compressor by means of shaft 5 and the exhaust gases are discharged through the jet pipe 4 as a propulsive jet.

Referring now to Fig. 2, the combustion chamber comprises an annular air casing formed by two tubular walls 11, 12, axially surrounding the driving shaft 5 (see Fig. 1) and defining between them an annular chamber. The chamber consists of an upstream divergent portion, a central parallel portion and a downstream convergent portion, this last portion being defined by frusto-conical walls 45, 46. Mounted within the annular air casing is an annular flame tube, similarly formed by two coaxial tubular walls, 13, 14. The flame tube also includes an upstream divergent section and a central parallel section, but the downstream parts 19, 20 of each wall are formed with longitudinally extending corrugations as will be explained below. The flame tube is held in spaced relationship with the walls of the air casing by means of rings of brackets 15, 16, 17, 18. It will be noted that the radial spacing of the inner walls of the flame tube and air casing is greater than that of the outer walls. This is to provide flow paths of equal cross-sectional area on both the radially inner and outer sides of the flame tubes.

The upstream ends of the air casing walls are provided with flanges for attachment to coaxial ring members 21, 22 constituting the outlet from compressor 1. These ring members are held in spaced relationship by compressor outlet vanes 23. Similarly, the downstream ends of the air casing walls are attached to a turbine nozzle ring consisting of coaxial ring members 24, 25 and turbine nozzle vanes 26. Downstream of the turbine nozzle vanes is a row of turbine rotor blades 37 carried on a rotor 38.

Mounted in the inlet to the flame tube is a fuel manifold consisting of a ring 27 mounted mid-way between the walls of the flame tube. The manifold ring is connected to a fuel supply by means of a pipe 28, and is pierced with a large number of holes evenly distributed around the circumference of the ring whereby the fuel is introduced into the airstream.

At the downstream end of the divergent portion of the flame tube is a flame stabilizer consisting of an annular channel or gutter 30 of triangular cross-section with its open end facing downstream. The edges of the gutter are formed with a large number of fingers 31a, 31b which extend almost to the wall of the flame tube where they are joined together with reinforcing rings 32a, 32b. Within the gutter are a number of pressure atomising fuel injectors 33 connected to a pipe 34 which runs around the interior of the gutter and is itself connected to a fuel supply by means of pipe 35. An igniter plug 36 projects into the flame tube between the fingers 31a.

In operation the compressed air from the compressor 1 is divided into three concentric streams by the flame tube inlet, the central stream entering the flame tube as combustion air and the inner and outer streams flowing as cooling air into the inner and outer spaces between the air casing and the flame tube. The central stream picks up the fuel from the manifold ring 27 and atomises it, and the resultant mixture is decelerated in the divergent part of the flame tube where further mixing is effected. The fuel injected by the pressure atomisers 33 is ignited by the igniter 36 to form a pilot flame which ignites the air-fuel mixture.

The above described fuel supply and flame stabilizing arrangement has been given by way of example only and itself forms the subject of co-pending United States patent application Serial No. 328,394 filed December 29, 1952, in the name of Wigg. It could be replaced by any suitable fuel injecting and ignition apparatus of known type. The present invention resides in the particular construction of the downstream end of the flame tube in combination with the disposition of the turbine nozzle vanes as will now be described.

As briefly mentioned above, the downstream end 19, 20 of each of the flame tube walls is formed with longitudinally extending corrugations or flutes 41, 42. The corrugations are shown as increasing progressively in depth towards the downstream extremity of the flame tube at which point the corrugations reach their maximum depth. At this point the outwardly extending crests of the corrugations are in contact with or very close to the parallel parts of the air casing walls 11, 12, and the inwardly extending crests approach the corresponding crests of the corrugations formed in the other wall of the flame tube as shown in Fig. 3. They accordingly form circumferentially alternating passages 43, 44 for hot gases from the interior of the flame tube and for cooling air from the spaces between the flame tube and the air casing walls respectively. In the embodiment shown the crests of the corrugations are rounded. There are equal numbers of corrugations in the inner and outer walls 19, 20 of the flame tube and they are so arranged that they are complementary to one another, that is each passage for hot gas and cooling air on one side of the flame tube will lie in the same plane as a passage for hot gas and cooling air respectively on the other side. For this reason the pitch of the corrugations 42 in the inner wall is less than the pitch of the corrugations 41 in the inner wall. So as to provide equal flow areas on each side of the flame tube the corrugations 42 in the inner wall are of somewhat greater depth. The number of passages for hot gases and for cooling air will each be equal to the number of turbine nozzle vanes, as will appear below.

The above described arrangement has the result that circumferentially alternating layers of hot gases and cooling air are discharged from the downstream end of the flame tube. Initially these layers only extend part of the way across the flame tube from each wall and there is a circumferentially extending layer of hot gas at the centre. However, since the crests of the inwardly extending parts of the corrugations 41, 42 are formed so that they approach towards one another in a downstream direction, there is a tendency for the layers to be likewise extended towards the central plane of the flame tube beyond the downstream end thereof. This tendency is assisted by the convergent walls 45, 46 forming the downstream end of the air casing, and accordingly at the entry to the turbine nozzle ring, the layers from each side should have merged with one another so that they will extend across the whole radial extent of the gas flow passage.

Figure 4:
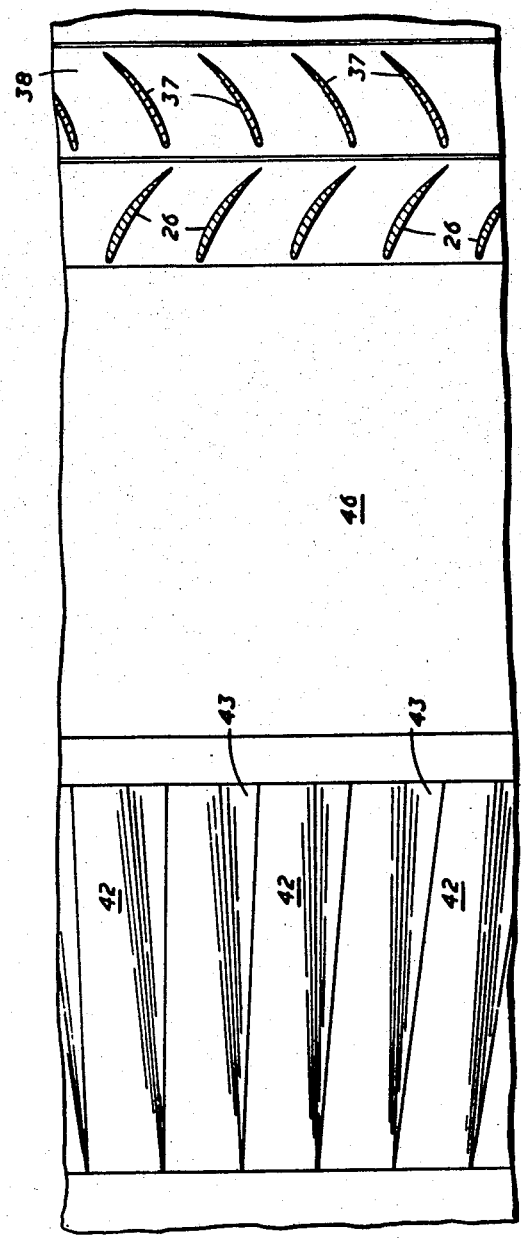
Fig. 4 is a developed fragmentary section taken on the circumferential line IV—IV in Fig. 3.

The turbine nozzle vanes 26, which are equal in number to the cooling air passages, each have their leading edges aligned with one of the cooling air layers. As shown in the developed view of Fig. 4, each vane is axially aligned with a cooling passage 44, it being assumed that the gases are discharged from the downstream end of the flame tube without whirl. If, however, there is any whirl in the gases, the vanes may be appropriately displaced in a circumferential direction with respect to the corrugations.

It is found that little or no mixing occurs between the end of the flame tube and the turbine nozzle inlet, and accordingly each turbine nozzle vane is cooled by a layer of cool air, while the hot gas layers pass between the nozzle vanes. The turbine blades 37 will take up a mean temperature by virtue of their rotation.

By avoiding the mixing problem in this way it is believed that the length of the combustion chamber can be materially reduced without incurring an excessive pressure loss. It is thought that the present invention will be most applicable to engines intended to have only a short life, since in such cases the effect on the turbine rotor blades of the non-uniform temperature distribution will not have time to become apparent.

I claim:

1. Gas turbine plant comprising an annular combustion chamber including an annular air casing having an annular outlet at one end and an annular flame tube enclosed by the aircasing and spaced therefrom to define therewith annular spaces; means for supplying combustion air to the interior of the flame tube and cooling air to said annular spaces; means to supply fuel to the interior of the flame tube; a turbine nozzle ring registering with the annular outlet of said aircasing and including a row of turbine nozzle vanes; and a row of turbine rotor blades downstream of the turbine nozzle vanes; the downstream end of at least one of the flame tube walls being formed with longitudinally extending corrugations defining circumferentially alternating passages for streams of hot combustion gases from the interior of the flame tube and cooling air from the annular space between the flame tube wall and the aircasing, and said turbine nozzle vanes being equal in number to and aligned with said streams of cooling air.

2. Plant according to claim 1 wherein the corrugations increase progressively in depth in a downstream direction.

3. Plant according to claim 1 wherein said turbine nozzle vanes are axially aligned with said passages for cooling air.

4. Gas turbine plant comprising an annular combustion chamber including an annular aircasing having an annular outlet at one end and an annular flame tube enclosed by the aircasing and spaced therefrom to define therewith annular spaces; means for supplying combustion air to the interior of the flame tube and cooling air to said annular spaces; means to supply fuel to the interior of the flame tube; turbine nozzle ring registering with the annular outlet of said aircasing and including a row of turbine nozzle vanes; the downstream ends of the flame tube walls being formed with longitudinally extending corrugations defining circumferentially alternating passages for streams of hot gases from the interior of the flame tube and cooling air from the annular spaces between the flame walls and the aircasing, the corrugations in each wall being equal in number and complementary to each other so that each passage for hot gases and each passage for cooling air formed by the corrugations of one wall lies in the same plane as a passage for hot gases and cooling air respectively formed by the corrugations of the other wall, and said turbine nozzle vanes being equal in number to and aligned with said streams of cooling air.

5. Plant according to claim 4 wherein the inwardly extending crests of the corrugations formed in the opposite walls of the flame tube progressively approach one another in the downstream direction.

6. Plant according to claim 5 wherein the outwardly extending crests of the corrugations progressively approach the aircasing walls in a downstream direction.

7. Plant according to claim 6 wherein the downstream end of the aircasing is constituted by a convergent annular duct.

References Cited in the file of this patent

UNITED STATES PATENTS

| 2,563,744 | Price | Aug. 7, 1951 |
| 2,565,308 | Hottel et al. | Aug. 21, 1951 |
| 2,588,532 | Johnson | Mar. 11, 1952 |
| 2,603,948 | Mims | July 22, 1952 |
| 2,625,792 | McCarthy et al. | Jan. 20, 1953 |

FOREIGN PATENTS

| 257,835 | Switzerland | Apr. 16, 1949 |